United States Patent
Pawar et al.

(10) Patent No.: US 11,357,004 B1
(45) Date of Patent: Jun. 7, 2022

(54) METHOD AND SYSTEM FOR LATENCY-BASED MANAGEMENT OF CARRIERS ON WHICH TO SERVE A USER EQUIPMENT DEVICE

(71) Applicant: Sprint Spectrum L.P., Overland Park, KS (US)

(72) Inventors: Hemanth B. Pawar, Brambleton, VA (US); Pratik Kothari, Sterling, VA (US); Chunmei Liu, Great Falls, VA (US); Krishna Sitaram, Chantilly, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 688 days.

(21) Appl. No.: 14/950,406

(22) Filed: Nov. 24, 2015

(51) Int. Cl.
*H04W 72/04* (2009.01)
*H04W 24/08* (2009.01)
*H04W 72/08* (2009.01)

(52) U.S. Cl.
CPC ....... *H04W 72/0453* (2013.01); *H04W 24/08* (2013.01); *H04W 72/085* (2013.01)

(58) Field of Classification Search
None
See application file for complete search history.

(56) References Cited

U.S. PATENT DOCUMENTS

| | | | |
|---|---|---|---|
| 8,064,910 B2 | 11/2011 | Lee | |
| 8,730,920 B2 | 5/2014 | Brownworth et al. | |
| 10,904,937 B1 * | 1/2021 | Pawar | H04W 76/16 |
| 10,986,634 B1 * | 4/2021 | Liu | H04L 47/14 |
| 2008/0175275 A1 * | 7/2008 | Garner | H04J 3/0667 370/503 |
| 2009/0207730 A1 * | 8/2009 | Stamoulis | H04W 72/12 370/230.1 |
| 2011/0312328 A1 * | 12/2011 | Choi | H04L 5/0062 455/450 |
| 2012/0099508 A1 * | 4/2012 | Frederiksen | H04W 92/20 370/312 |
| 2012/0182914 A1 * | 7/2012 | Hariharan | H04L 1/189 370/329 |
| 2012/0218987 A1 * | 8/2012 | Zhao | H04W 56/0005 370/350 |
| 2013/0083661 A1 * | 4/2013 | Gupta | H04W 28/0215 370/235 |
| 2013/0142113 A1 * | 6/2013 | Fong | H04W 52/242 370/328 |
| 2013/0208601 A1 * | 8/2013 | Cui | H04W 24/10 370/252 |

(Continued)

*Primary Examiner* — Christopher T Wyllie (57) ABSTRACT

A method and system for managing carriers on which a base station provides service to a user equipment device (UE), based on consideration of latency. A base station that is arranged to operate on a plurality of carriers may, while serving a UE on a set of one or more carriers of the plurality, select, from at least two other carriers of the plurality, an additional carrier to add to the set of one or more carriers on which the base station serves the UE, and may make the selection based a latency on the selected carrier. In response to selecting the additional carrier, the base station may add the selected carrier to the set of one or more carriers on which the base station serves the UE, and may then serve the UE on the set of one or more carriers including the selected carrier.

20 Claims, 4 Drawing Sheets

(56) References Cited

U.S. PATENT DOCUMENTS

| | | | |
|---|---|---|---|
| 2013/0308519 A1* | 11/2013 | Gou | H04L 12/1877 |
| | | | 370/312 |
| 2013/0336201 A1* | 12/2013 | Nishio | H04L 1/1854 |
| | | | 370/315 |
| 2015/0280871 A1* | 10/2015 | Xu | H04W 72/0446 |
| | | | 370/330 |
| 2016/0242180 A1* | 8/2016 | Richards | H04L 69/321 |
| 2017/0064706 A1* | 3/2017 | Patel | H04W 72/0446 |
| 2017/0277806 A1* | 9/2017 | Trossen | H04L 67/2842 |

* cited by examiner

50 — WHILE SERVING A UE AT A PARTICULAR SERVICE LEVEL ON A SET OF ONE OR MORE CARRIERS OF THE PLURALITY, THE BASE STATION SELECTS, FROM AT LEAST TWO OTHER CARRIERS OF THE PLURALITY, AN ADDITIONAL CARRIER TO ADD TO THE SET OF ONE OR MORE CARRIERS ON WHICH THE BASE STATION SERVES THE UE, WHERE THE SELECTING COMPRISES (I) DETERMINING, FOR THE PARTICULAR SERVICE LEVEL, ON EACH CARRIER OF THE AT LEAST TWO OTHER CARRIERS, A RESPECTIVE LATENCY, AND (II) SELECTING, FROM THE AT LEAST TWO OTHER CARRIERS, A CARRIER TO BE THE ADDITIONAL CARRIER, AND WHERE SELECTING THE CARRIER TO BE THE ADDITIONAL CARRIER IS BASED ON (A) THE LATENCY AT THE PARTICULAR SERVICE LEVEL ON THE SELECTED CARRIER AND (B) THE PARTICULAR SERVICE LEVEL BEING A SERVICE LEVEL AT WHICH THE BASE STATION IS SERVING THE UE ON THE SET OF ONE OR MORE CARRIERS

52 — RESPONSIVE TO THE SELECTING, THE BASE STATION ADDS THE SELECTED CARRIER TO THE SET OF ONE OR MORE CARRIERS ON WHICH THE BASE STATION SERVES THE UE, AND THE BASE STATION THEN SERVES THE UE ON THE SET OF ONE OR MORE CARRIERS INCLUDING THE SELECTED CARRIER

METHOD AND SYSTEM FOR LATENCY-BASED MANAGEMENT OF CARRIERS ON WHICH TO SERVE A USER EQUIPMENT DEVICE

BACKGROUND

In a wireless communication system, a base station may provide one or more coverage areas, such as cells or sectors, in which the base station may serve user equipment devices (UEs), such as cell phones, wirelessly-equipped personal computers or tablets, tracking devices, embedded wireless communication modules, or other devices equipped with wireless communication functionality (whether or not operated by a human user).

In general, each coverage area may operate on one or more carriers each defining one or more ranges of frequency spectrum and having a respective "downlink channel" for carrying communications from the base station to UEs and a respective "uplink channel" for carrying communications from the UEs to the base station. Such carriers may be frequency division duplex (FDD), in which the downlink and uplink channels are defined as separate respective ranges of frequency, or time division duplex (TDD), in which the downlink and uplink channels are defined on a common range of frequency but distinguished through time division multiplexing. Further, the downlink channel and uplink channel of each carrier may also be divided into respective sub-channels for carrying particular communications, such as one or more control channels for carrying control signaling and one or more traffic channels for carrying application-layer data and other traffic. Note that the range (e.g., distance) of coverage provided by a given coverage area may vary on each of its carriers.

When a UE is positioned within coverage of a base station in such a system, the UE may register with the base station by transmitting a registration request, such as an attach request, to the base station. In response to the base station receiving the registration request, the base station or associated network infrastructure may authenticate and authorize the UE for service and may reserve network resources for use to serve the UE. For instance, the registration request may lead to setup in the network of one or more logical bearers, data-link-layer connections, or the like, as well as assignment to the UE of a radio-link-layer connection defining a downlink and uplink over the air interface between the UE and the base station.

In this system, the base station may be arranged to serve registered UEs with data communication. To facilitate communication of data from the base station to served UEs, the base station may first receive, from a packet-switched network by way of network infrastructure, data for transmission to the served UEs, the data taking the form of one or more data packets. The base station may then transmit each of such packets to the UEs over the air interface on a given one or more carriers. For a given packet, a measurement of delay in the network providing the packet to a UE may be referred to herein as a "latency," or a "level of latency," of that packet. In practice, latency may vary from packet to packet, from time to time, etc.

Furthermore, with this arrangement, the bandwidth of the carrier on which the base station serves a UE may pose an effective limit on the peak rate of data communication between the base station and the UE, as the bandwidth would define only a limited number of air interface resources, with data rate being further limited based on air interface conditions.

To overcome this data rate limitation and improve throughput to the UE, or for other reasons, a base station can serve the UE on multiple carriers at once, providing what is known as "carrier aggregation" service. With carrier aggregation service, multiple carriers from either contiguous frequency bands or non-contiguous frequency bands are aggregated together as "component carriers" to increase the overall bandwidth available per slot by providing a greater extent of air interface resources in which the base station can schedule uplink and downlink communication. Further, with carrier aggregation, one of the carriers may be deemed to be a primary carrier or primary cell (PCell) and each other carrier may be deemed to be a secondary carrier or secondary cell (SCell). In some scenarios, communication of bearer data and control signaling associated with the bearer data may occur on the PCell, whereas only communication of bearer data may occur on an SCell. In other scenarios, however, it is possible for such control signaling to occur on the PCell, as well as on at least one SCell.

OVERVIEW

When a base station is serving a UE on one or more carriers, the base station may encounter a trigger scenario where it would be useful for the base station to add an additional carrier to its service of the UE. For instance, if the base station determines that a particular type of content will be communicated between the base station and the UE (e.g., content that is latency sensitive and/or that is a substantial) and perhaps if the current serving carrier is threshold heavily loaded, the base station may decide that it would be useful to add another carrier to its service of the UE so as to help increase the peak data rate available for the UE. If the base station is currently serving the UE on just one carrier, this may be a decision that it would be useful to begin providing the UE with carrier aggregation service on that carrier (e.g., as PCell) together with another carrier (e.g., as SCell). Or if the base station is already providing the UE with carrier aggregation service, this may be a decision that it would be useful to add another carrier (e.g., another SCell) to the base station's service of the UE.

In these carrier aggregation scenarios, it may be worthwhile for the base station to select an optimal carrier to add as an SCell to the UE's radio-link-layer connection with the base station. Per the disclosure, one basis for selecting an optimal carrier to add as an SCell to the UE's radio-link-layer connection could be a consideration of latency of the selected carrier. In particular, the base station could select an optimal carrier to add as an SCell to the UE's radio-link-layer connection based on a determination that latency on the selected carrier is threshold low, or is threshold lower than latency on other candidate carriers. For instance, if the base station determines that there is low latency on a candidate carrier (e.g., a short average wait time between when the base station receives packets and when the base station transmits the packets on the candidate carrier), the base station may decide that the candidate carrier would be an optimal carrier and may thus select that candidate carrier to add as an SCell to the UE's radio-link-layer connection. On the other hand, if the base station determines that there is high latency on the candidate carrier (e.g., a long average wait time between when the base station receives packets and when the base station transmits the packets on the candidate carrier), the base station may decide that the candidate carrier would not be an optimal carrier and may thus not select that candidate carrier to add as an SCell to the UE's radio-link-layer connection. In response to selecting the optimal carrier, the base station could add the selected carrier to the UE's radio-link-layer connection and then serve the UE concurrently on the carriers of the UE's radio-link-layer connection.

Accordingly, in one respect, disclosed herein is a method operable by a base station arranged to serve UEs over an air interface on a plurality of carriers. The method involves, while serving a UE on a set of one or more carriers of the plurality, the base station selecting, from at least two other carriers of the plurality, an additional carrier to add to the set of one or more carriers on which the base station serves the UE, where the selecting is based on a latency on the selected carrier. Further, the method involves responsive to the selecting, the base station adding the selected carrier to the set of one or more carriers on which the base station serves the UE, and the base station then serving the UE on the set of one or more carriers including the selected carrier.

Furthermore, this optimal carrier selection process may be particularly useful in scenarios in which the UE itself is experiencing undesirable latency on its serving carrier(s). For example, in a scenario in which the UE is initially being served on a single carrier, the base station may determine that there is threshold high latency for communications to the UE on that carrier, and responsively then engage in the carrier selection process noted above to facilitate adding an additional carrier on which to serve the UE. As another example, in a scenario in which the UE is initially being served on multiple carriers, the base station may determine that, even though the UE is already being served with communications concurrently on multiple carriers, there is statistically high latency for communications to the UE on those carriers (e.g., a high average latency across all of the carriers), and responsively then engage in the carrier selection process noted above to facilitate adding yet another carrier on which to serve the UE.

Moreover, it may be advantageous in some implementations of the disclosed process for the base station to consider, as a more specific basis for selecting an optimal carrier to add to the base station's service of the UE at issue, latency for a service level of the UE. In particular, this may be an advantageous consideration because, as a result of the disclosed process, the UE will come to be served at that service level on the added carrier, and will thus experience latency for communications at that service level. To facilitate such a consideration, data packets that are received by the base station and destined for the UE may contain values indicating a particular service level at which the UE is being served. As such, the base station may refer to these values to determine the service level at which the UE is being served, and then select an optimal carrier based on the level of latency per carrier for the determined service level (e.g., a carrier on which there is low latency of communications to UEs served at the determined service level).

Accordingly, in another respect, disclosed is a method operable by a base station arranged to serve UEs over an air interface on a plurality of carriers. The method involves, while serving a UE at a particular service level on a set of one or more carriers of the plurality, the base station selecting, from at least two other carriers of the plurality, an additional carrier to add to the set of one or more carriers on which the base station serves the UE. The selecting comprises (i) determining, for the particular service level, on each carrier of the at least two other carriers, a respective latency, and (ii) selecting, from the at least two other carriers, a carrier to be the additional carrier, where selecting the carrier to be the additional carrier is based on (a) the latency at the particular service level on the selected carrier and (b) the particular service level being a service level at which the base station is serving the UE on the set of one or more carriers. Further, the method involves responsive to the selecting, the base station adding the selected carrier to the set of one or more carriers on which the base station serves the UE, and the base station then serving the UE on the set of one or more carriers including the selected carrier.

Still further, in another respect, disclosed is a base station configured to carry out some or all of the operations noted above. In an example arrangement, for instance, the base station includes an antenna structure for radiating to define a coverage area, wherein the coverage area operates on a plurality of carriers that are available for use in providing service to UEs over an air interface. Further, the base station includes a controller comprising at least one processing unit, data storage, and program instructions stored in the data storage and executable by the at least one processing unit to carry out operations such as those noted above.

In that arrangement, the controller may be configured to, while serving a UE on a set of one or more carriers of the plurality, determine a measurement of latency for communications to the UE on the set of one or more carriers, where latency is delay between receipt of data packets by the base station and transmission of the data packets by the base station over the air interface. The controller may be further configured to, based on the measurement of latency for communications to the UE on the set of one or more carriers, select, from at least two other carriers of the plurality, a carrier to be included in the set of one or more carriers on which the base station serves the UE, for use in providing the UE with carrier aggregation service, where the selecting is further based on a measurement of latency on the selected carrier. And the controller may be further configured to, responsive to the selecting, modify the set of one or more carriers on which the base station serves the UE to include the selected carrier, and then serve the UE with the carrier aggregation service concurrently on the set of one or more carriers including the selected carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE. However, it will be understood that principles of the disclosure can extend to apply in other scenarios as well, such as with respect to other air interface protocols, such as Code Division Multiple Access (CDMA) (e.g., 1×RTT and 1×EV-DO) or Global System for Mobile Communications (GSM), among other possibilities. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
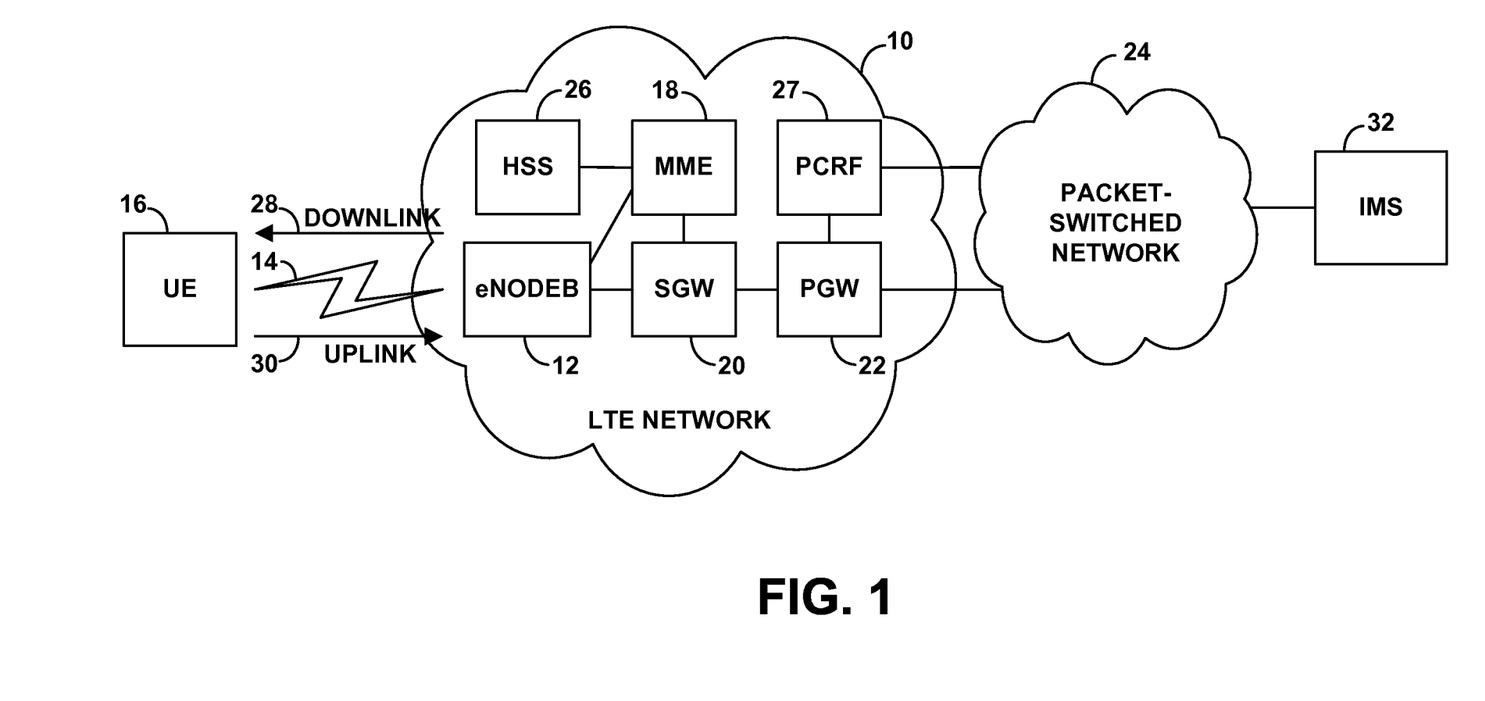
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, but may also provide other functions. As shown, the LTE network includes a base station (eNodeB) 12, which has an antenna structure and associated equipment for radiating to define an LTE coverage area 14 that operates on a plurality of carriers available for use in providing service to UEs, such as example UE 16, over an LTE air interface. The eNodeB 12 then has a communication interface with a mobility management entity (MME) 18 that functions as a signaling controller for the LTE network. Further, the eNodeB 12 has a communication interface with a serving gateway (SGW) 20, which in turn has a communication interface with a packet-data network gateway (PGW) 22 that provides connectivity with a packet-switched network 24, and the MME has a communication interface with the SGW 20 and with a home subscriber server (HSS) 26. Still further, the PGW has a communication interface with a policy and charging rules function (PCRF) 27. In practice, the illustrated components of the LTE network may sit as nodes on a private packet-switched network owned by an operator of the LTE network, and thus the various communication interfaces may be logical interfaces through that network.

As further shown, the system of FIG. 1 includes an Internet Multimedia Subsystem (IMS) platform 32 accessible via the packet-switched network 24, which functions to support voice over Internet Protocol (VoIP) call connections such as voice over LTE (VoLTE) calls and other such packet-based real-time media sessions.

As illustrated, the air interface of coverage area 14 defines a downlink direction 28 from the eNodeB to the UE and an uplink direction 30 from the UE to the eNodeB. Further, the eNodeB and UE may be configured (e.g., licensed and programmed) to support air interface communication on various particular carriers, which may be FDD or TDD. Each such carrier and/or its particular downlink and uplink channels may be identified by one or more globally unique identifiers per industry standard, so that the eNodeB and a served UE can refer to particular carriers by those identifiers.

According to LTE, each carrier's downlink channel may then define various sub-channels, such as a physical downlink control channel (PDCCH) for carrying scheduling directives and other control signaling from the eNodeB to UEs, a physical downlink shared channel (PDSCH) for carrying scheduled downlink data communication, and a reference channel for carrying a reference signal that UEs can monitor to evaluate coverage quality. Likewise, each carrier's uplink channel may define various sub-channels, such as a physical uplink control channel (PUCCH) for carrying scheduling requests and other control signaling from the UEs to the eNodeB and a physical uplink shared channel (PUSCH) for carrying scheduled uplink data communication.

With this arrangement, when UE 16 enters into coverage of eNodeB 12, the UE may detect a reference signal broadcast from eNodeB on a particular carrier. Upon detecting the reference signal, the UE may responsively then engage in random access signaling with the eNodeB (to notify the eNodeB that the UE is trying to gain access) and engage in signaling with the eNodeB to establish a radio-link-layer connection (i.e., air interface connection) on the detected carrier, so that the eNodeB may then serve the UE on that carrier. For instance, the UE and eNodeB may exchange radio-resource-control (RRC) configuration messaging in order to prepare the eNodeB to serve the UE on the carrier (e.g., then exchanging control signaling and bearer traffic with the UE on that carrier) and to prepare the UE to be served on the carrier (e.g., then exchanging control signaling and bearer traffic with the eNodeB on that carrier). As such, the radio-link-layer connection could be considered to effectively encompass initially just that one carrier.

Further, the UE may engage in attach signaling with the LTE network via the eNodeB to register the UE with the LTE network on the detected carrier. For instance, the UE may initially transmit to the eNodeB an attach message, and upon receipt of the attach message, the eNodeB may forward the attach message to the MME, and the MME may then engage in signaling with the HSS 26 and perhaps further signaling with the UE, to authorize and authenticate the UE, and may obtain from the HSS various service profile information (i.e., a profile record) for the UE for storage as a local context record for the UE at the MME, the eNodeB, and/or other LTE network elements. Such a profile record may include various subscription information about the UE, such as a service-level-agreement (SLA) level of the UE that the LTE network may use as a basis for determining whether or not to prioritize downlink transmissions to the UE.

After the MME engages in signaling with the HSS and perhaps further signaling with the UE, the MME may then engage in signaling with the SGW and the eNodeB, and the SGW may engage in signaling with the PGW. Through all of this attach signaling and/or subsequently, the MME may coordinate establishment for the UE of one or more bearers extending between the UE and the PGW, each including a radio-bearer portion between the UE and the eNodeB and an access-bearer portion between the eNodeB and the PGW (via the SGW). Each bearer may also have a particular service level, possibly designated by a Quality of Service Class Identifier (QCI) value, where a lowest QCI value corresponds to a highest service level such as a high guaranteed bit rate (for communications such as VoLTE traffic, for instance), whereas a highest QCI value corresponds with a lowest service level such as best-efforts communication (e.g., web browsing traffic and messaging traffic). One such default bearer may be a best-efforts bearer for carrying general IP communications at low service level (e.g., QCI 8 or 9). Further, for a UE that subscribes to IMS service, another such default bearer may be an IMS signaling bearer for carrying Session Initiation Protocol (SIP) signaling between the UE and the IMS at a medium service level (e.g., QCI 5).

At some point, the UE may come to operate in an RRC "connected" mode, in which the eNodeB may serve the UE with data communication over the UE's serving carrier(s) on one or more established bearers. To facilitate this data communication service in practice, the eNodeB may receive data packets for the UE (e.g., from the packet-switched network 24 via PGW 22 and SGW 20), allocate air interface resources within the UE's radio-link-layer connection to carry the packets to the UE, and transmit the packets to the UE over the UE's radio-link-layer connection in accordance with the allocation. However, because the throughput on the air interface between the eNodeB and the UE may not be as high as the throughput of receiving packets at the eNodeB in practice, the eNodeB may sometimes place received packets in queue, schedule a time to transmit the packets to the UE, and then at the scheduled time, transmit the packets to the UE over the UE's radio-link-layer connection.

The packets that the eNodeB receives may each have a respective payload segment that carries some or all of the data at issue, and may perhaps each have a respective header segment. In practice, a packet's header may indicate to the eNodeB various information about the packet, such as a source IP address of the packet, a destination IP address of the packet, and a service level at which the UE is being served with data communication. Regarding service level in particular, the packet's header may include a QCI level value that the eNodeB could consider to be an indication of the service level of the bearer to be used for carrying the packet, and thus as an indication of the service level of the UE to which the packet is destined. Alternatively, the packet's header may include a differential service point code (DSCP) value that the eNodeB could consider to be an indication of the service level for the packet, or that the eNodeB may map to a corresponding QCI level that the eNodeB could then consider to be an indication of the service level of the UE.

Further, the data carried in a packet's payload segment may be a digitally encoded representation of particular content being communicated. As such, if desired, the eNodeB may use various techniques (e.g., deep packet inspection (DPI)) to read the packet to determine a type of content being carried by such packet(s), where the type of content may serve as an indication to the eNodeB that the UE is engaging in communication of that type of content.

In practice, the eNodeB may take into account various factors when determining how to allocate resources for packets and when to schedule packets for transmission over the air interface. One such factor may be QCI level. For instance, the eNodeB may allocate more resources for and/or give higher priority of transmission for packets with a lower QCI level (e.g., VoLTE data) than for packets with a higher QCI level (e.g., IMS data or web browsing data). Another such factor may be SLA level. For instance, the eNodeB may allocate more resources for and/or give higher priority of transmission for packets destined for a UE with a "platinum" or "gold" SLA level (or perhaps for a UE with an SLA level that indicates that the UE is associated with emergency services) than for packets destined for a UE with a "silver" or otherwise lower priority SLA level. Yet another factor may be content type. In line with QCI level, the eNodeB may allocate more resources for and/or give higher priority of transmission for packets carrying VoLTE data than for packets carrying IMS data or web browsing data.

Furthermore, as noted above, the eNodeB may be configured to determine a measurement of latency for any given packet destined for a UE served by the eNodeB, including example UE 16. As further noted above, a latency of a given packet may be a measurement of delay in the network providing the packet to a UE. As such, latency for a given packet destined to a UE could be measured from the time the eNodeB receives the packet to the time the eNodeB transmits the packet over the air interface to the UE. Latency could be measured in other ways as well, such as a time between when the packet is transmitted from a gateway (e.g., SGW 20) to the eNodeB and when the eNodeB transmits the packet over the air interface to the UE, or a time between when the eNodeB first puts the packet into a queue and when the eNodeB transmits the packet over the air interface to the UE (or perhaps when the UE receives the packet). Other examples of latency measurements are possible as well.

Further, the eNodeB may be configured to roll up multiple per-packet latency measurements to establish other statistical evaluations of latency. By way of example, to establish a latency on a given carrier (e.g., an average or other statistical measure of latency on the carrier), the eNodeB may roll up multiple such measurements for packets that the eNodeB has transmitted on that carrier over a most recent sliding window of time. Still further, the eNodeB may roll up multiple per-carrier latency measurements to establish a single latency evaluation of multiple carriers (e.g., an average latency for packets that the eNodeB has transmitted on the multiple carriers over a most recent sliding window of time). Other examples are possible as well.

In line with the packet allocation/scheduling discussion above, the service level at which packets are transmitted to a UE may affect latency of those packets. For instance, given two UEs that are equally situated, it may be the case that a first UE receiving packets at a higher service/priority level may experience lower latency than a second UE receiving packets at a lower service/priority level, due to the first UE's packets being scheduled for earlier transmission than the second UE's packets. Similarly, content type may affect latency as well. For instance, a first UE receiving higher priority VoLTE packets (e.g., QCI 1) may experience lower latency than a second UE receiving lower priority web browsing data.

During the initial attach process discussed above and/or more likely later while serving the UE, the eNodeB and UE may engage in RRC configuration messaging and/or other processing to modify or otherwise set the UE's radio-link-layer connection to encompass a different number of carriers. For example, if the connection currently encompasses just one carrier, the process could be used to change the connection to encompass a different carrier and/or to add one or more additional carriers (e.g., as SCells) so as to facilitate carrier aggregation service. As another example, if the connection currently encompasses two or more carriers, the process could be used to add one or more additional carriers to the connection so as to provide increased carrier aggregation, or to remove one or more carriers from the connection so as to provide reduced carrier aggregation or to switch to single-carrier service. Other examples are possible as well.

To set or adjust the carriers encompassed by the UE's radio-link-layer connection, the eNodeB may transmit to the UE an RRC connection message (e.g., an initial RRC connection message, or an RRC connection reconfiguration message) that specifies the carriers on which the eNodeB will be serving the UE, identifying each carrier by its global identifier for instance. In particular, to facilitate carrier aggregation service, the eNodeB may specify which carrier will be used as a PCell by designating one such carrier with a PCell-specific index number (e.g., zero), and the eNodeB may specify which other carrier(s) will be used as one or more SCells by designating the carrier(s) with SCell-specific index number(s) (e.g., 1 through 7). Such RRC connection messaging will prepare the eNodeB to serve the UE on the carriers and prepare the UE to be served on the carriers.

As discussed above, it may be useful in some scenarios for the eNodeB to select an additional carrier to add as an SCell to the UE's radio-link-layer connection so as to increase throughput. And as further discussed above, it may be advantageous in these scenarios for the eNodeB to select an optimal carrier that would be most useful for the UE, so that addition of the selected carrier does not undesirably affect user experience. Further, as noted above, one basis for selecting an optimal carrier to add as an SCell to the UE's radio-link-layer connection could be a consideration of latency of the selected carrier. For instance, the eNodeB may consider a candidate carrier to be an optimal carrier in this context if the eNodeB determines that the carrier has a latency that is threshold low (i.e., lower than a predetermined threshold) or is threshold lower than latency on the carrier(s) currently encompassed by the UE's radio-link-layer connection. On the other hand, the eNodeB may consider a candidate carrier not to be an optimal carrier if the eNodeB determines that the carrier has a latency that is threshold high (i.e., higher than a predetermined threshold) or is threshold higher than latency on the carrier(s) currently encompassed by the UE's radio-link-layer connection.

Accordingly, per the disclosure, the eNodeB may engage in a process in which the eNodeB considers latency on each candidate carrier and selects an optimal carrier based on that consideration. In particular, while the eNodeB is serving the UE on a set of one or more carriers encompassed by the UE's radio-link-layer connection, the eNodeB could consider latency measurements on at least two other candidate carriers different from the set of one or more carriers as a basis for selecting an optimal carrier to add as an SCell to the set. Then, in response to selecting the optimal carrier, the eNodeB could add the selected carrier to the set and then serves the UE concurrently on the set including the selected carrier.

To establish measurements of latency on a per-carrier basis, the eNodeB may evaluate, for each candidate carrier, recent latency for packets that the eNodeB has transmitted on that carrier. In an example implementation of the disclosed process, for instance, the eNodeB may consider latency for all packets that the eNodeB has recently transmitted on a candidate carrier. To facilitate this in practice, as discussed above, the eNodeB may roll up latency measurements for all packets that the eNodeB has transmitted on the candidate carrier over a most recent sliding window of time.

As noted above, the service level of packets may impact latency (e.g., lower latency for packets transmitted at a high priority service level). Thus, in another example implementation of the disclosed process, the eNodeB may consider latency for packets recently transmitted on a candidate carrier at a service level similar to or the same as the service level at which the eNodeB is serving the UE. To facilitate this in practice, the eNodeB may first determine the service level at which the eNodeB is serving the UE. The eNodeB may then roll up latency measurements for packets that the eNodeB has transmitted on the candidate carrier over a most recent sliding window of time to UEs served at the determined service level (or at a similar service level).

One type of service level that the eNodeB may consider is a QCI level at which the eNodeB is serving the UE. To establish an evaluation of latency on the candidate carrier at a particular QCI level, the eNodeB may first determine the QCI level at which the eNodeB is serving the UE by referring to the headers of packets transmitted to the UE, which may include a QCI level value (or a DSCP value associated to the QCI level value) that the eNodeB could consider to be an indication of the QCI level of the bearer used for carrying the packets to the UE, as discussed above. Based on the UE being served at that QCI level, the eNodeB may then roll up latency measurements for packets that the eNodeB has transmitted on the candidate carrier over a most recent sliding window of time to UEs served at the determined QCI level (or at a similar QCI level).

Another type of service level that the eNodeB may consider is an SLA level of the UE. To establish an evaluation of latency on the candidate carrier at a particular SLA level, the eNodeB may first determine the UE's SLA level by referring to the profile record of the UE, which may include an indication of that SLA level. Based on the UE being served at that SLA level, the eNodeB may then roll up latency measurements for packets that the eNodeB has transmitted on the candidate carrier over a most recent sliding window of time to UEs served at the determined SLA level (or at a similar SLA level). It should be noted that other types of service levels may affect latency as well, and thus such other types of service levels could be considered as well, additionally or alternatively to QCI level and SLA level.

Further, the eNodeB could apply similar logic to consider other attributes of the UE at issue different from service level and use a consideration of such attributes as a basis for determining latency on candidate carriers to UEs with attributes similar to those of the UE at issue. For instance, the eNodeB may consider a model number of the UE, a geographic location of the UE, or another attribute of the UE as a basis for determining latency on a candidate carrier. Other examples are possible as well.

As further noted above, the type of content carried by packets may impact latency as well. Thus, in yet another example implementation of the disclosed process, the eNodeB may consider latency for packets recently transmitted on a candidate carrier that have a similar or the same content type as the packets that the eNodeB has been transmitting to the UE. To facilitate this in practice, the eNodeB may first use various techniques, such as DPI, to read the packets transmitted to the UE and determine a type of content being carried by the packets, as discussed above. The eNodeB may then roll up latency measurements for packets of the determined content type (or of a similar content type) that the eNodeB has transmitted on the candidate carrier over a most recent sliding window of time.

Furthermore, as noted above, the disclosed process may be particularly useful in scenarios in which the UE itself is experiencing threshold high or otherwise undesirable latency on its serving carrier(s). For example, in a scenario in which the UE is initially being served on a single carrier, the eNodeB may determine that there is threshold high latency for packets transmitted to the UE on that carrier, and responsively then engage in the disclosed process to add an SCell to the UE's radio-link-layer connection. As another example, in a scenario in which the UE is initially being served on multiple carriers, the eNodeB may determine that, even though the UE is already being served with communications concurrently on multiple carriers, there is statistically high latency for packets transmitted to the UE on those carriers (e.g., a high average latency across all of the carriers), and responsively then engage in the disclosed process to facilitate adding another SCell to the UE's radio-link-layer connection.

Moreover, the eNodeB may make the above-noted determinations of latency at various points in time. For example, the eNodeB may periodically or continuously monitor, and store in memory, any or all of the latency measurements discussed above, and may refer to the stored measurements when performing the disclosed process. As another example, the eNodeB may be triggered to begin monitoring and/or storing such latency measurements in response to the eNodeB detecting threshold high latency experienced by the UE at issue.

In addition to possibly increasing throughput over the UE's radio-link-layer connection, the disclosed process may provide other benefits. For instance, the addition of an SCell that has threshold low latency (or lower latency than the UE's other serving carrier(s)) could enable the eNodeB to allocate/schedule more data to be transmitted on the added SCell than on the UE's other serving carrier(s).

Figure 2:
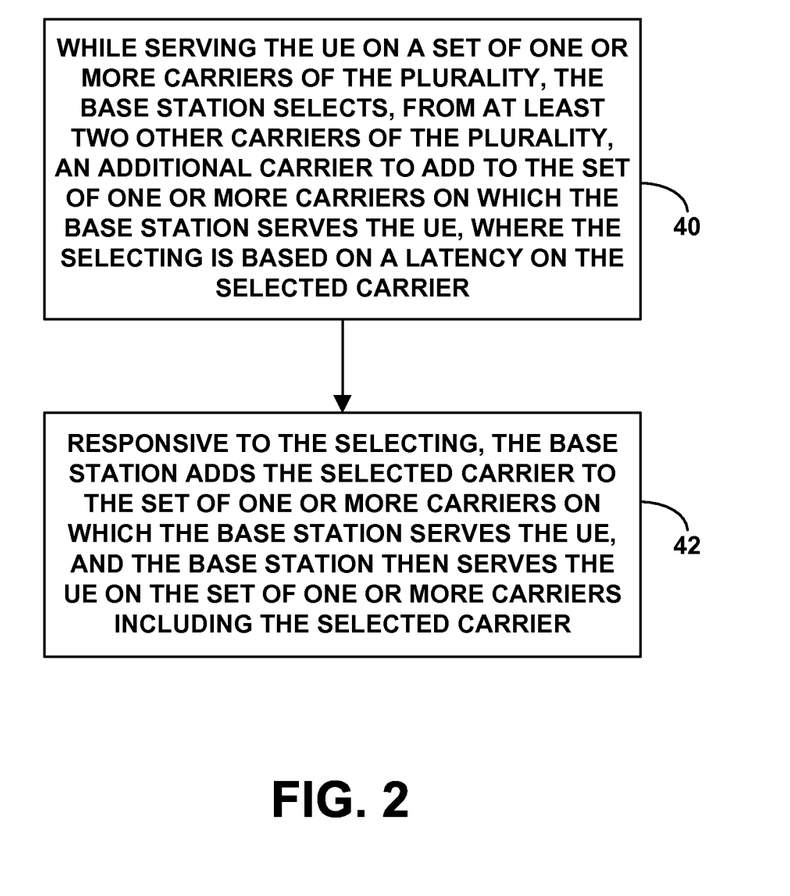
FIG. 2 is a flow chart depicting example operations in accordance with the disclosure.

FIG. 2 is next a flow chart depicting an example set of operations that can be carried out by a base station such as eNodeB 12 that is arranged to serve UEs over an air interface on a plurality of carriers. As shown in FIG. 2, at block 40, while serving a UE on a set of one or more carriers of the plurality, the base station selects, from at least two other carriers of the plurality, an additional carrier to add to the set of one or more carriers on which the base station serves the UE, where the selecting is based on a latency on the selected carrier. And at block 42, responsive to the selecting, the base station adds the selected carrier to the set of one or more carriers on which the base station serves the UE, and the base station then serves the UE on the set of one or more carriers including the selected carrier.

Various other features described above could be incorporated into this method. For instance, the selecting process may more particularly involve the base station determining, for each carrier of the at least two other carriers, a respective latency on the carrier, where the base station establishes the respective latency to be a respective measurement of delay between receipt of data packets by the base station and transmission of the data packets by the base station over the air interface on the carrier. Further, the selecting process may then involve the base station selecting, from the at least two other carriers, a carrier to be the additional carrier based on the determined latency on the selected carrier.

In some implementations of this method, while serving the UE on the set of one or more carriers, but before selecting an additional carrier, the base station may determine that latency for communications to the UE on the set of one or more carriers exceeds a predetermined latency threshold, and may responsively then begin to evaluate latency on each candidate carrier in search of an optimal carrier to add to the set. And as noted above, the base station may select a candidate carrier to be the additional charrier to add to the set only if the base station determines that latency on that candidate carrier is lower than a predetermined latency threshold.

It should be noted that, in practice, the thresholds discussed herein for determining whether a given measurement of latency is threshold high or threshold low may be the same or different thresholds.

Figure 3:
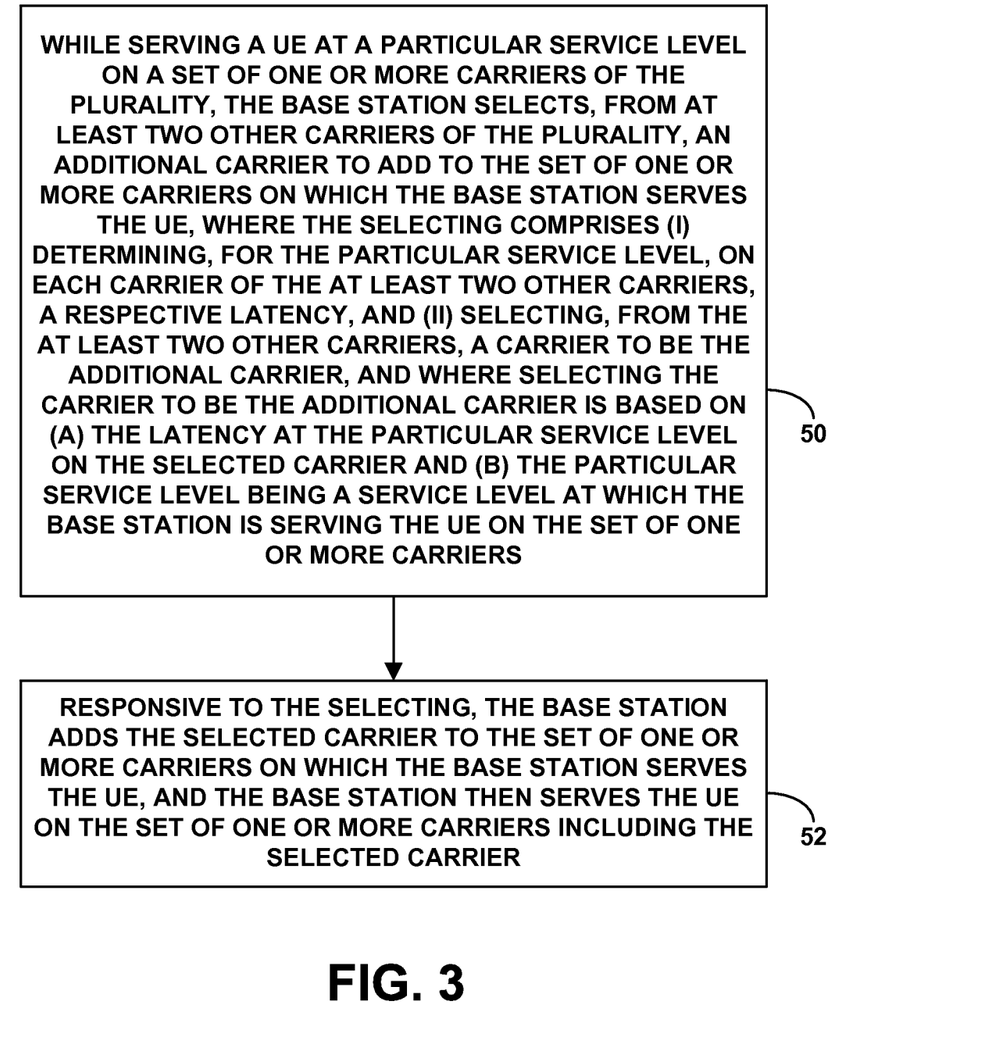
FIG. 3 is another flow chart depicting example operations in accordance with the disclosure.

FIG. 3 is next a flow chart depicting another example set of operations that can be carried out by a base station such as eNodeB 12 in an implementation of this process. As shown in FIG. 3, at block 50, while serving a UE at a particular service level on a set of one or more carriers of the plurality, the base station selects, from at least two other carriers of the plurality, an additional carrier to add to the set of one or more carriers on which the base station serves the UE, where the selecting comprises (i) determining, for the particular service level, on each carrier of the at least two other carriers, a respective latency, and (ii) selecting, from the at least two other carriers, a carrier to be the additional carrier, and where selecting the carrier to be the additional carrier is based on (a) the latency at the particular service level on the selected carrier and (b) the particular service level being a service level at which the base station is serving the UE on the set of one or more carriers. And at block 52, responsive to the selecting, the base station adds the selected carrier to the set of one or more carriers on which the base station serves the UE, and the base station then serves the UE on the set of one or more carriers including the selected carrier. Various other features described above could be incorporated into this method as well.

Further, as noted above, it may be advantageous to consider latency at a service level similar to or the same as the service level at which the eNodeB is serving the UE because, as a result of the disclosed process, the UE may come to be served at that service level on the added carrier, and will thus experience latency for communications at that service level.

It should be noted that, while latency is primarily discussed herein as a delay between receipt of packets by the eNodeB and transmission of the packets by the eNodeB over the air interface, other types of latency are possible as well, such as those noted above. As such, in other implementations of the disclosed process, one or more of these other types of latency could be considered as an additional or alternative basis for selecting an optimal carrier to add to the UE's radio-link-layer connection.

Figure 4:
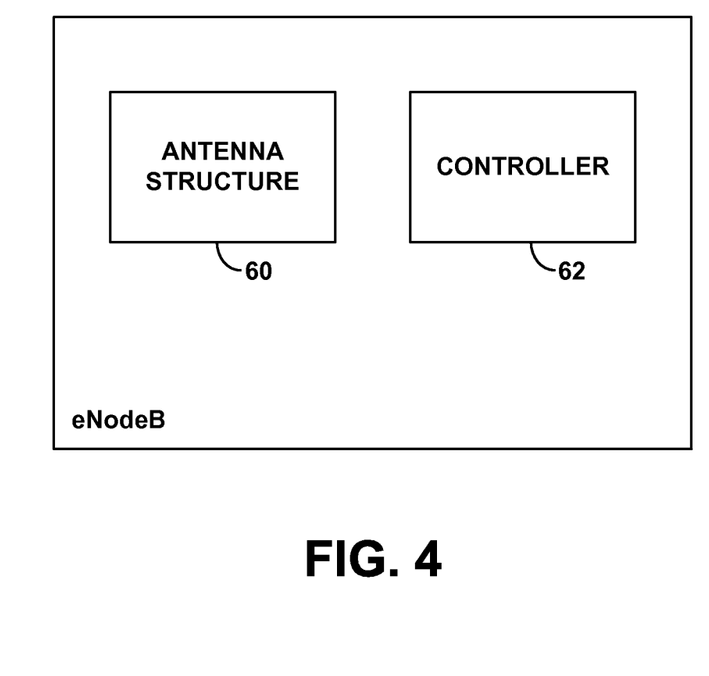
FIG. 4 is a simplified block diagram of an example base station operable in accordance with the disclosure.

Finally, FIG. 4 is a simplified block diagram of a base station of an example eNodeB (e.g., macro eNodeB, small cell, or other type of base station), showing some of the components that such a device may include in order to carry out these and other operations. As shown, the example eNodeB includes an antenna structure 60 that radiates to define an air interface coverage area for serving UEs, where the coverage area operates on a plurality of carriers. Further, the example base station includes a controller 62 that manages wireless communication via the antenna structure.

Controller 62 could be implemented using hardware, software, and/or firmware. For example, controller 62 could include at least one processing unit and a non-transitory computer readable medium (e.g., volatile and/or non-volatile memory) that stores machine language instructions or other executable instructions. The instructions, when executed by the one or more processors, may cause controller 62, and thus the eNodeB, to carry out the various base station operations described herein. For instance, such operations may include (i) while serving a UE on a set of one or more carriers of the plurality, determining a measurement of latency for communications to the UE on the set of one or more carriers, (ii) based on the measurement of latency for communications to the UE on the set of one or more carriers, selecting, from at least two other carriers of the plurality, a carrier to be included in the set of one or more carriers on which the base station serves the UE, for use in providing the UE with carrier aggregation service, where the selecting is further based on a measurement of latency on the selected carrier, and (iii) responsive to the selecting, modifying the set of one or more carriers on which the base station serves the UE to include the selected carrier, and then serving the UE with the carrier aggregation service concurrently on the set of one or more carriers including the selected carrier.

Note that, although the discussion above focuses primarily on selecting a carrier to add as a new carrier to a UE's radio-link-layer connection, the principles described above could be extended to other implementations as well. For instance, rather than or in addition to the UE's serving base station selecting/adding a new carrier to the UE's radio-link-layer connection based on a consideration of latency per carrier, the base station may consider latency per carriers as a basis for selecting a new carrier to replace an existing carrier of the UE's radio-link-layer connection. This implementation may be useful in various scenarios, such as where the UE is experiencing undesirable conditions (e.g., threshold high latency) on a given one or more carriers of the UE's radio-link-layer connection, but when there may be a limit on the number of carriers on which the base station can provide carrier aggregation service. In such a scenario, due to this limit, the base station may not be able to add a new carrier to the UE's radio-link-layer connection, but could instead select a new carrier based on a consideration of latency per carrier as discussed above, and then modify the UE's radio-link-layer connection to replace one carrier (e.g., a carrier on which the UE is experiencing the most latency) with the selected carrier.

To facilitate modifying the UE's radio-link-layer connection in this manner, in line with the discussion above, the base station may transmit to the UE an RRC connection message that specifies each of the carriers on which the base station will be serving the UE, including a specification of the new selected carrier, but not including a specification of the carrier that is being removed from the UE's radio-link-layer connection. In particular, the base station may designate one such carrier with a PCell-specific index number, and the base station may designate each other carrier with SCell-specific index number(s). The base station may then also update its context record for the UE to indicate that the UE's radio-link-layer connection now encompasses the specified carriers, so that the base station may then engage in communication with the UE on those carriers. And the UE may responsively update its context record to indicate that the UE's radio-link-layer connection now encompasses the specified carriers, so that the UE will be prepared to engage in communication with the base station on those carriers.

While various aspects have been disclosed herein, other aspects will be apparent to those skilled in the art. The various aspects disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. In a communication system comprising a base station arranged to serve user equipment devices (UEs), a method comprising:
the base station serving a UE over a radio-link-layer connection between the base station and the UE, wherein the radio-link-layer connection initially encompasses one or more carriers, and wherein the UE has a service level at which the base station is serving the UE;
while serving the UE at the service level over the radio-link-layer connection encompassing the one or more carriers, the base station selecting an additional carrier to add to the radio-link-layer connection, wherein the selecting comprises (i) determining the service level of the UE, (ii) based on the determined service level, determining, on each carrier of at least two other carriers, a respective latency of communications with one or more other UEs that have the same service level as the UE, and (iii) selecting, from the at least two other carriers, a carrier to be the additional carrier, wherein selecting the carrier to be the additional carrier is based on the determined latency on the selected carrier; and responsive to the selecting, the base station reconfiguring the radio-link-layer connection to additionally encompass the selected carrier, whereby the base station then serves the UE over the radio-link-layer connection additionally encompassing the selected carrier.

2. The method of claim 1, wherein determining, on each carrier of the at least two other carriers, the respective latency of communications with the one or more other UEs that have the same service level as the UE comprises determining, on each carrier of the at least two other carriers, the respective latency over a sliding window of time.

3. The method of claim 1, wherein determining, on each carrier of the at least two other carriers, the respective latency comprises:
establishing, on each carrier of the at least two other carriers, the respective latency to be a respective measurement of delay between receipt of data packets by the base station and transmission of the data packets by the base station on the carrier to the one or more other UEs.

4. The method of claim 1, wherein determining, on each carrier of the at least two other carriers, the respective latency comprises:
establishing, on each carrier of the at least two other carriers, the respective latency to be a respective measurement of average delay between receipt of data packets by the base station and transmission of the data packets by the base station on the carrier to the one or more other UEs.

5. The method of claim 1, wherein the UE has a particular attribute, and
wherein the selecting is further based on the one or more other UEs having the same particular attribute as the UE.

6. The method of claim 5, wherein the particular attribute is a geographic location of the UE.

7. The method of claim 1, wherein, while serving the UE over the radio-link-layer connection encompassing the one or more carriers, the base station receives one or more data packets and transmits the one or more data packets to the UE,
wherein determining the service level at which the base station is serving the UE comprises determining the service level based on the one or more data packets containing information indicating the service level, the information including one or both of: a respective differential service point code (DSCP) value, and a respective Quality of Service Class Identifier (QCI) level value.

8. The method of claim 1, further comprising:
the base station determining a type of content that the base station is communicating with the UE; and
based on the determined type of content that the base station is communicating with the UE, the base station determining, on each carrier of the at least two other carriers, a respective latency of communications of the determined type of content with the UE,
wherein selecting the carrier to be the additional carrier is further based on the determined latency of communication of the type of content on the selected carrier.

9. The method of claim 8, wherein, while serving the UE over the radio-link-layer connection encompassing the one or more carriers, the base station receives one or more data packets and transmits the one or more data packets to the UE,
wherein determining the type of content that the base station is communicating with the UE comprises determining the type of content based on the one or more data packets containing information indicating the type of content.

10. The method of claim 1, further comprising:
before selecting the additional carrier to add to the radio-link-layer connection, and while serving the UE over the radio-link-layer connection encompassing the one or more carriers, the base station determining that a measurement of latency of communications to the UE on the one or more carriers exceeds a predetermined latency threshold,
wherein the selecting is performed responsive to determining that the measurement of latency of communications to the UE on the one or more carriers exceeds the predetermined latency threshold.

11. The method of claim 1, wherein the selecting being based on the determined latency on the selected carrier comprises the selecting being based on a measurement of latency on the selected carrier being lower than a predetermined latency threshold.

12. In a communication system comprising a base station arranged to serve user equipment devices (UEs), a method comprising:
the base station serving a UE over a radio-link-layer connection between the base station and the UE, wherein the radio-link-layer connection initially encompasses one or more carriers, and wherein the UE has a service level at which the base station is serving the UE;
while serving the UE at the service level over the radio-link-layer connection encompassing the one or more carriers, the base station selecting an additional carrier to add to the radio-link-layer connection, wherein the selecting comprises (i) determining the service level of the UE, (ii) based on the determined service level, determining, on each carrier of at least two other carriers, a respective latency of communications to one or more other UEs that have the same service level as the UE, and (iii) selecting, from the at least two other carriers, a carrier to be the additional carrier, wherein selecting the carrier to be the additional carrier is based on the determined latency on the selected carrier, and
responsive to the selecting, the base station reconfiguring the radio-link-layer connection to additionally encompass the selected carrier, whereby the base station then serves the UE over the radio-link-layer connection additionally encompassing the selected carrier.

13. The method of claim 12, wherein determining, on each carrier of the at least two other carriers, the respective latency comprises:
establishing, on each carrier of the at least two other carriers, the respective latency to be a respective measurement of delay between receipt of data packets by the base station and transmission of the data packets by the base station on the carrier.

14. The method of claim 12, further comprising:
before selecting the additional carrier to add the radio-link-layer connection, and while serving the UE over the radio-link-layer connection encompassing the one or more carriers, the base station determining that a measurement of latency of communications to the UE on the one or more carriers exceeds a predetermined latency threshold,
wherein the selecting is performed responsive to determining that the measurement of latency of communications to the UE on the one or more carriers exceeds the predetermined latency threshold.

15. The method of claim 12, wherein the selecting being based on the determined latency on the selected carrier comprises the selecting being based on a measurement of communication latency on the selected carrier being lower than a predetermined latency threshold.

16. The method of claim 12, wherein selecting the additional carrier to add to the radio-link-layer connection comprises selecting, from the at least two other carriers, the additional carrier to be a secondary carrier (SCell) added to the radio-link-layer connection, for use in providing the UE with carrier aggregation service, and
wherein, by reconfiguring the radio-link-layer connection to additionally encompass the selected SCell, the base station then serves the UE, over the radio-link-layer connection additionally encompassing the selected SCell, with the carrier aggregation service concurrently on the one or more carriers and the selected SCell.

17. A base station comprising:
an antenna structure for radiating to define a coverage area in which to provide service to user equipment devices (UEs); and
a controller comprising at least one processing unit, data storage, and program instructions stored in the data storage and executable by the at least one processing unit to carry out operations, the operations comprising:
serving a UE over a radio-link-layer connection between the base station and the UE, wherein the radio-link-layer connection initially encompasses one or more carriers, and wherein the UE has a service level at which the base station is serving the UE;
while serving the UE at the service level over the radio-link-layer connection encompassing the one or more carriers, determining a measurement of latency of communications to the UE on the one or more carriers;
based on the measurement of latency of communications to the UE on the one or more carriers, and while serving the UE at the service level over the radio-link-layer connection encompassing the one or more carriers, selecting an additional carrier to include in the radio-link-layer connection for use in providing the UE with carrier aggregation service, wherein the selecting comprises (i) determining the service level of the UE, (ii) based on the determined service level, determining, on each carrier of at least two other carriers, a respective latency of communications to one or more other UEs that have the same service level as the UE, and (iii) selecting, from the at least two other carriers, a carrier to be the additional carrier, wherein selecting the carrier to be the additional carrier is based on the determined latency on the selected carrier, wherein determining, on each carrier of the at least two other carriers, the respective latency comprises establishing, on each carrier of the at least two other carriers, the respective latency to be a respective measurement of delay between receipt of data packets by the base station and transmission of the data packets by the base station on the carrier to the one or more other UEs; and
responsive to the selecting, reconfiguring the radio-link-layer connection to encompass the selected carrier, whereby the base station then serves the UE with the carrier aggregation service over the radio-link-layer connection encompassing the selected carrier.

18. The base station of claim 17, wherein reconfiguring the radio-link-layer connection to encompass the selected carrier comprises reconfiguring the radio-link-layer connection to encompass the selected carrier but to no longer encompass a given carrier of the one or more carriers.

19. The base station of claim 17, wherein determining the measurement of latency of communications to the UE on the one or more carriers comprises determining that the measurement of latency of communications to the UE on the one or more carriers exceeds a predetermined latency threshold,
   wherein selecting based on the measurement of latency of communications to the UE on the one or more carriers comprises performing the selecting responsive to determining that the measurement of communication latency of communications to the UE on the one or more carriers exceeds the predetermined latency threshold,
   wherein selecting the carrier to be the additional carrier based on the determined latency on the selected carrier comprises selecting the carrier to be the additional carrier based on the determined latency on the selected carrier being lower than the predetermined latency threshold.

20. The base station of claim 17, wherein determining, on each carrier of the at least two other carriers, the respective latency of communications with the one or more other UEs that have the same service level as the UE comprises determining, on each carrier of the at least two other carriers, the respective latency over a sliding window of time.

\* \* \* \* \*